June 21, 1966 G. RIVIERRE ETAL 3,256,754
DEVICE FOR CENTERING A CYLINDRICAL MEMBER
Filed April 18, 1963 2 Sheets-Sheet 1

Inventors
Georges Rivierre
Bernard Ramillon
By Stevens, Davis, Miller & Mosher
Attorneys

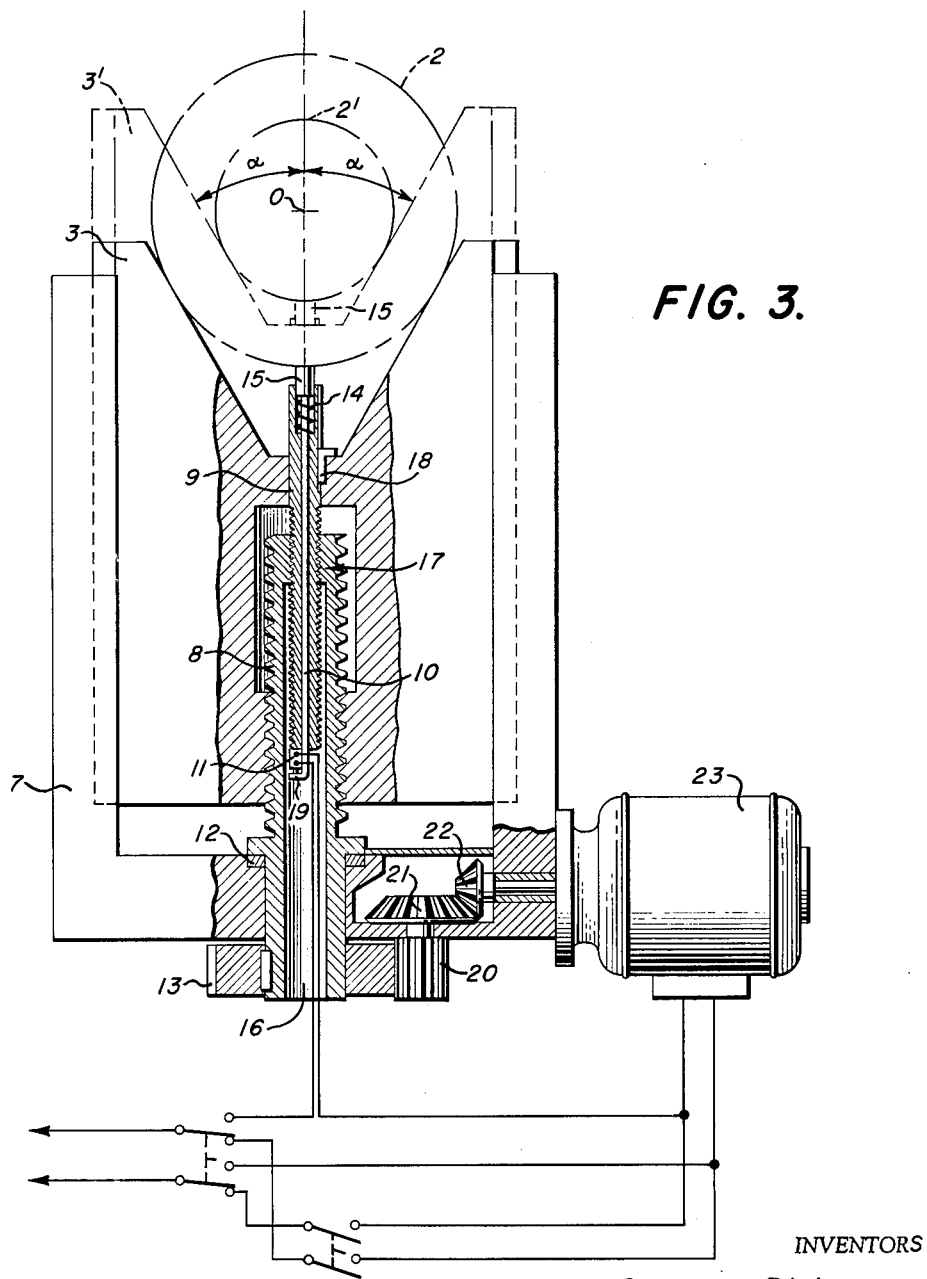

United States Patent Office 3,256,754
Patented June 21, 1966

3,256,754
DEVICE FOR CENTERING A CYLINDRICAL MEMBER
Georges Rivierre and Bernard Ramillon, Epernay, France, assignors, by mesne assignments, to Societe Anonyme H. Ernault-Somua, Paris, France, a corporation of France
Filed Apr. 18, 1963, Ser. No. 273,922
Claims priority, application France, May 9, 1962, 896,989, Patent 1,330,266
3 Claims. (Cl. 77—18)

Railway rolling-stock axles are withdrawn from service for reconditioning when the wear or defects occurring therein have attained the limits set by strict regulations.

To perform the so-called "refreshing" operations on worn circular parts (such as tyres or spindles) the axles are mounted between centers, the machining centers formed at both ends of the axle body serving as reference marks therefor.

During actual service, these centers are frequently deformed or oxidized and must be reconditioned before the different refreshing operations can be commenced.

It is the intermediate cylindrical portion of the circular journals of the axle spindles that are used as a rule for reconditioning the centers corresponding to the geometrical axis of the axle and warranting the concentricity of the essential component elements of the axle.

According to an advantageous solution to this problem the axis of the aforesaid intermediate cylindrical portion of each spindle is brought to a position of strict coincidence with the machining axis of the reconditioning machine, this last-named axis being fixed and taken as reference.

As a rule, concentric V-shaped supports, clamps or vices are used on conventional centering machines, but they are scarcely convenient for heavy parts like railway axles either because their dimensions would become prohibitive in relation to the surveying machine on which the center reconditioning operation is rationally contemplated, or because their precision would not be reliable due to their too small dimensions.

It is the essential object of this invention to provide a device for centering a solid of revolution on a given reference axis, which is applicable notably to the machining of railway rolling-stock axle centers, and permits a rational solution of the problem set forth hereinabove.

In a device according to this invention the axle bears tangentially by means of its spindles on the arms of two V-shaped supports mounted for vertical sliding adjustment. The planes of symmetry of the V-shaped supports (the bisecting plane) contain the axis of the sliding movements of these supports as well as the axis of the center machining operation.

The lower portion of each V is internally threaded and constitutes a nut movable vertically but held against rotation, engaging the threads of a control screw bearing against the framework of the mechanism through a footstep bearing, the rotation of this screw involving the vertical motion of the V-shaped support concerned.

For centering the axle on the axis of the machining mechanism the operator simply moves the V-shaped supports and therefore the axle vertically until the geometrical center of the intermediate cylindrical portion of each spindle is level with the axis of the center machining mechanism.

This positioning at the desired height may be accomplished with a high degree of accuracy irrespective of the spindle diameters and without necessitating the knowledge of the spindle diameter, due to the following mechanism:

Within the adjustment screw and coaxially thereto (the screw axis being coincident with the bisecting plane of the V-shaped support) a rod is slidably mounted and constantly urged against an upper stop member by a spring. This rod is rigid with a sleeve also guided for vertical sliding motion and externally threaded, this screwlike sleeve engaging a nut rigid with and concentric to said adjustment screw.

This sleeve carries at its lower portion a microswitch actuatable by the relevant end of the aforesaid sliding rod.

Under these conditions, the sliding movements of the V-shaped support and of the sleeve are conjugated but related and such that they correspond mathematically to the same position in the space of the center of any cylinder inscribed in the V-shaped recess of the support.

This position is obtained when the upper end of the sliding rod contacts the lower generatrix of the tangent cylinder and then operates the microswitch, thus releasing a signal controlling the stoppage of the sliding movement of said V-shaped support.

In order to afford a clearer understanding of the present invention and of the manner in which the same may be carried out in practice, a typical form of embodiment thereof will now be described by way of example with reference to the accompanying drawings, in which:

FIGURE 3 is a fragmentary section showing a V-shaped support of the machine constructed according to the teachings of this invention.

Figure 1:
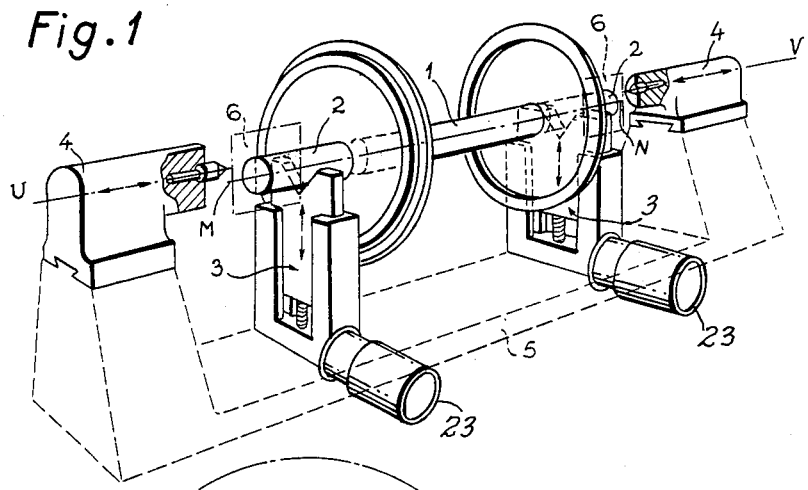
FIGURE 1 is a diagrammatic perspective view showing an axle mounted on the device of this invention.

In this device (see FIG. 1) the axle 1 has its spindles 2 placed on a pair of V-shaped supports and blocks 3 secured on a bed 5 of the machine of which the machining heads are designated by the reference numerals 4. Blocks 3 are moved in a reciprocal vertical direction by motor 23 through gearing shown in FIG. 3.

By construction, the common bisecting plane 6 of the V-shaped supports which already contains the axis MN common to the intermediate cylindrical portions of axles 2 contains likewise the ideal machining axis UV.

This axis UV is fixed in the space.

The axis MN is displacable vertically in plane 6 due to the vertical movement of translation of the V-shaped supports, which is obtained by means of a mechanism permitting a strict and automatic centering of the aforesaid axis MN relative to axis UV, without requiring any measurement of the diameter of the spindles supported by the V-blocks.

Figure 2:
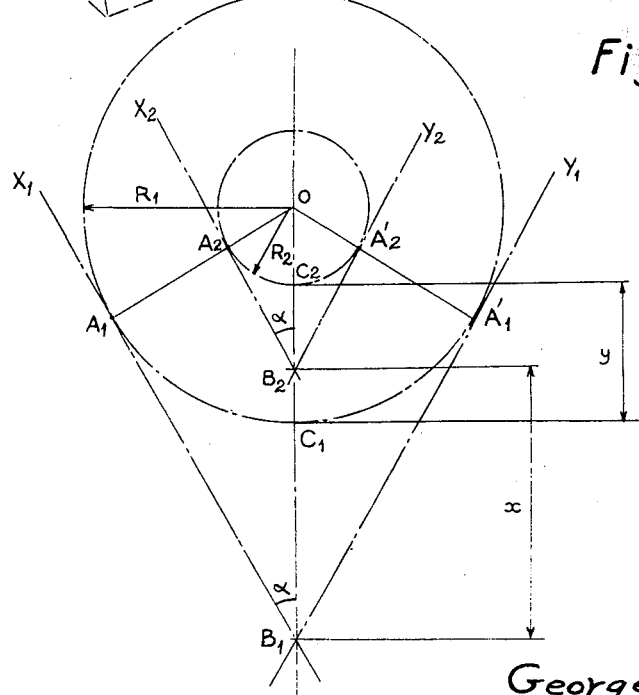
FIGURE 2 is a geometrical illustration of the basic principle of this invention.

The principle of this mechanism is set forth diagrammatically in FIG. 2.

In this diagram, a first position of a V-shaped support is shown at $X_1B_1Y_1$, the faces $B_1X_1$ and $B_1Y_1$ of this V-shaped support being respectively tangent at $A_1$ and $A'_1$ to a spindle of center 0 and radius $R_1$.

If this spindle were replaced with another spindle of radius $R_2$ (assumed to be smaller in the example illustrated in the figure) the V-shaped support should be raised by a height $B_1B_2=x$ so that the center of this second spindle be still coincident with 0.

During this movement, the V-shaped support moves to $X_2B_2Y_2$, its faces being tangent to the second spindle at $A_2$ and $A'_2$.

As will be seen in the drawing, raising the V-shaped support by $B_1B_2=x$ corresponds to an upward movement $C_1C_2=y$ of the lowermost point of the spindle.

Now there is a proportionality relationship between $x$ and $y$, as will be explained hereinafter:

Assuming that $\alpha$ is the half-angle of the V, the following equalities are obtained:

$$OB_1 = \frac{OA_1}{\sin \alpha} = \frac{R_1}{\sin \alpha} \qquad OB_2 = \frac{OA_2}{\sin \alpha} = \frac{R_2}{\sin \alpha}$$

Therefore $$B_2B_1 = OB_1 - OB_2 = \frac{R_1 - R_2}{\sin \alpha}$$

and considering that $B_2B_1=x$, $R_1-R_2=C_1C_2=y$, from which $$x = \frac{y}{\sin \alpha} \text{ or } y = x \sin \alpha$$

Thus, if the second spindle is centered exactly like the first one, this proportionality relationship between $x$ and $y$ is strictly confirmed. Conversely, if this relationship is ascertained, the two spindles are centered exactly in the same manner, and this is the central or basic principle of the present invention.

This basic principle can easily be carried out in practice by simply associating with each V-shaped support a feeler adapted to engage the lowermost point of the spindle and mounted for vertical movement, its movement being associated with that of the V-shaped support in order constantly to provide the above relationship $$y = x \sin \alpha$$

A particularly simple form of embodiment of this device is obtained by providing V-shaped supports having 60-degree angle, whereby $\alpha=30°$ and $\sin \alpha = \frac{1}{2}$.

The above relationship is then $$y = \frac{x}{2}$$

A practical form of embodiment of the device of this invention which is based on this last principle is illustrated in FIG. 3.

In this figure, the reference numeral 2 is a spindle supported by a vertically adjustable V-shaped support (adapted to be moved to position $3_1$ for supporting a spindle $2_1$).

The V-block 3 is slidably mounted in a fixed guide member 7 (solid with the frame structure of the machine) by means of an adjustment screw 8; one portion of the V-shaped member constitutes the nut engaged by this screw, the latter revolving in a vertical footstep bearing 12 fitted in member 7 and being rotatably driven through a pinion 13 spur gear 20, and bevel gears 21 and 22, the latter of which is mounted on the shaft of motor 23.

This screw 8 is also formed with a recess 16 having an internally threaded upper portion 17 engaged by an externally threaded sleeve 9 rotatably rigid with the V-shaped block 3 due to the provision of a key 18 permitting its vertical sliding movement.

The screw pitch of this sleeve 9 has the same direction (for example a left-hand pitch) as that of rod 8 but has only one-half of its value. Mounted for vertical sliding movement in this sleeve 9 is a rod 10 constituting a feeler member having its contact head 15 constantly urged upwards by a spring 14 for engagement with the spindle to be centered, and provided at its lower end with a bent finger 19 normally engaging a microswitch 11.

This device operates as follows:

Before positioning a spindle on the V-shaped support, the latter is firstly raised to its uppermost position with the sleeve 9 fully retracted therein.

With the spindle thus positioned, the operator rotates the screw 8 to lower the V-shaped support, whereby the sleeve and its feeler head are raised in relation to the V-shaped support.

When the feeler head 15 contacts the spindle, the finger 19 actuates the microswitch 11 and a signal controlling the stoppage of the vertical movement of the V-shaped support 3 is released.

The precision of the centering operation is obtained by using V-shaped supports 3 having a strictly accurate 60-degree opening, so that the relative motion between the V and the sleeve takes place exactly in the ratio of 2 to 1.

The threaded portions of the screw-and-nut assembly controlling the V-shaped support and those of the sleeve may thus be made with the maximum precision since they are machined on the same machine tool and from the same lead screw.

More generally, the basic principle of the device is applicable also for a different orientation (that is, other than vertical) of the bisecting plane of the V and of the solid of revolution, by simply rigidly assembling these last-named two elements in order to ensure their positive connection during the displacements of the V-shaped support.

Although the present invention has been described with reference to typical embodiments thereof, it will be readily understood by anybody conversant with the art that many modifications and variations may be brought thereto without departing from the spirit and scope of the invention as set forth in the appended claims.

What is claimed is:

1. A device for centering a cylindrical member on a given reference axis, said device comprising a housing, at least one V-shaped support mounted for reciprocal movement in said housing and adapted to support said cylindrical member, an adjustment screw trunnioned in said housing in threaded engagement with said support, a feeler sleeve in threaded engagement with said screw for reciprocal movement with respect thereto in a direction opposite to the movement of said support, means to rotate said screw to cause said reciprocal movement of said support and said sleeve, and means associated with said sleeve to stop said movements upon the engagement of the upper end of said sleeve with said cylindrical member, the angle of the V of the support and the respective screw pitches of the screw, the slieeve and the support being such that the cylindrical member is centered with respect to a predetermined reference axis upon the engagement of the sleeve therewith.

2. The device of claim 1, wherein said screw is hollow and is disposed in a bore in said support, the axis of said bore being coincidental with the bisecting plane of the V of said support, and wherein said sleeve is disposed in the hollow portion of said screw.

3. The device of claim 1, wherein said stop means comprises an elongated rod disposed in said sleeve for reciprocal axial movement with respect thereto, said rod having a contact head a portion of which extends outwardly from the end of said sleeve adjacent said cylindrical member, means normally urging said head in a direction outward from said sleeve but permitting movement of said head in an opposite direction on contact thereof with said cylindrical member, and a switching means responsive to movement of said head in said opposite direction to immediately stop the rotation of said screw.

References Cited by the Examiner

UNITED STATES PATENTS 1,017,193  2/1912  Whiton _____ 77—18

FOREIGN PATENTS 425,456  2/1926  Germany.
863,435  1/1953  Germany.
882,940  7/1953  Germany.

WILLIAM W. DYER, Jr., *Primary Examiner.*

FRANCIS S. HUSAR, *Examiner.*